United States Patent

[11] 3,616,171

| [72] | Inventor | John Donald Hoskinson, Sr. |
| --- | --- | --- |
| | | Lancaster, Ohio |
| [21] | Appl. No. | 764,703 |
| [22] | Filed | Oct. 3, 1968 |
| [45] | Patented | Oct. 26, 1971 |
| [73] | Assignee | The Goodyear Tire & Rubber Company |
| | | Akron, Ohio |

[54] METHOD OF MAKING A FOAMED ARTICLE AND SAID ARTICLE
1 Claim, 2 Drawing Figs.

[52] U.S. Cl. ..................................................... 161/160,
161/205, 260/41, 264/45, 5/337, 161/119
[51] Int. Cl. ..................................................... B32b 7/04
[50] Field of Search .......................................... 161/205,
160, 161; 260/41 A; 5/337

[56] References Cited
UNITED STATES PATENTS

| 2,247,337 | 6/1941 | Raflovich ...................... | 161/161 |
| 2,907,383 | 10/1959 | Kloote et al. .................. | 161/205 |
| 3,002,868 | 10/1961 | Boivin ........................... | 161/160 |
| 2,558,378 | 6/1951 | Petry ............................. | 260/41 A |

Primary Examiner—Morris Sussman
Attorneys—F. W. Brunner and J. D. Wolfe

ABSTRACT: This invention relates to a foamed article having a foamed core and a vinyl resin skin wherein the inner layer of the skin adjacent the foam contains asbestos fibers.

PATENTED OCT 26 1971　　　　　　　　　　　　　3,616,171

INVENTOR.
JOHN D. HOSKINSON, SR
BY J. D. Wolfe

ATTORNEY

METHOD OF MAKING A FOAMED ARTICLE AND SAID ARTICLE

This invention relates to skin covered foam articles and the method of making said articles.

Although foam articles having a skin covering are widely used commercially; cast skin-covered articles have on major weakness, namely, for some services it is essential that the skin be supported by fabric to give the skin sufficient tear resistance and strength under sustained loads to keep the foamed articles from deforming or being destroyed.

Threfore, an object of this invention is to provide a foamed article having a skin covering wherein the skin has sufficient structural strength to resist deforming under sustained loads or deterioration due to nicks or cuts that tend to grow with use.

Figure 1:
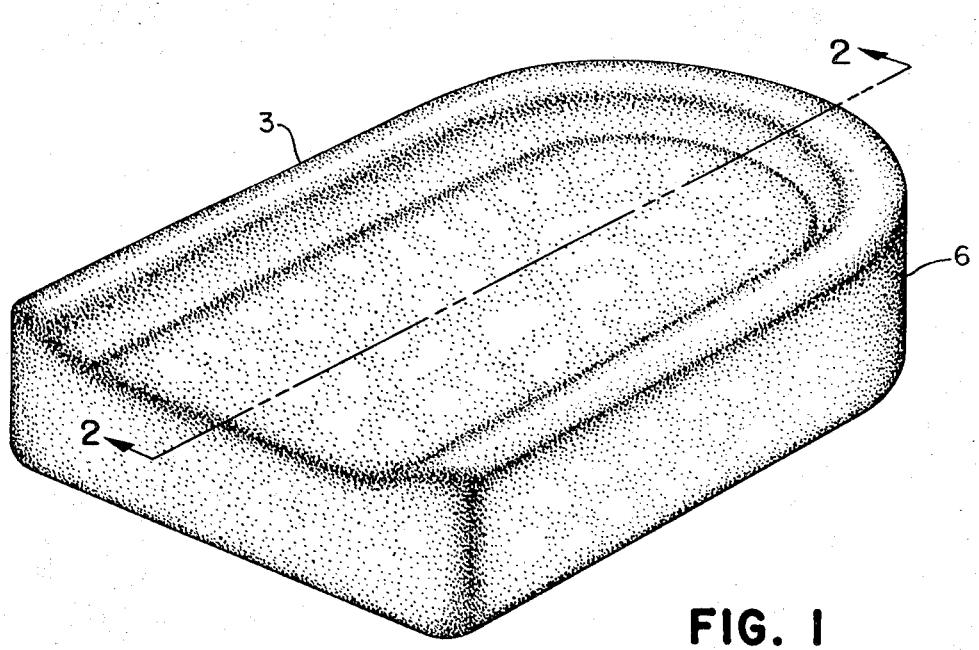
Figure 2:
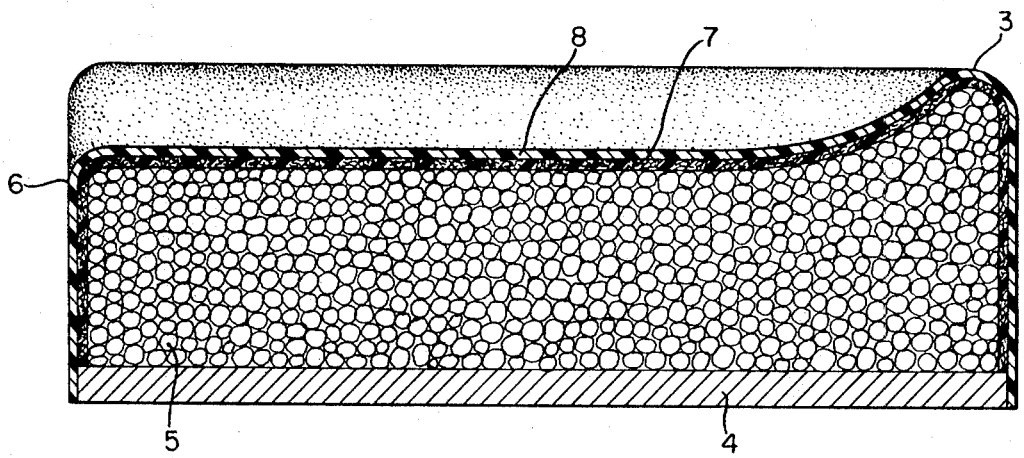

The nature of this invention may more readily be understood by reference to the drawings wherein:

FIG. 1 is a perspective view of a seat cushion and
FIG. 2 is a cross section through the seat cushion of FIG. 1.

Referring to FIG. 1 it will be seen that the seat cushion 3 has a skin cover that contains a fibrous filler to maintain the skin in the desired configurational outline. The exact construction of the seat cushion can more readily be observed by reference to FIG. 2 where the base or insulating member 4 has resting thereon foam 5 and having adhered around the foam a skin 6. It should be noted that the skin to which the foam adheres is in effect a laminate with the inside part of the skin 7 being adhered to the foam and then having a coat 8 adhered to the layer 7 to give the finished skin 6. Also, since the inside part 7 of the skin has asbestos fibers therein, these fibers give a better bond between the foam and the skin.

To prepare the skin for the foamed article of this invention it is preferred that the skin be formed by casting using slush-molding or rotary-casting techniques in suitable apparatus known to the art. For instance, a suitably pigmented vinyl plasticized resin either of the liquid or of the dry-powdered type is placed in a suitable slush box and is then fitted with a mold at the appropriate skin forming temperature. Then the box and mold as a unit are rotated or slushed to dump the dry powder or liquid resin into the hot mold where the heat of the mold fuses the resin to form layer 8 within the mold. Where excess dry powder is used in the slush box it is removed from the mold by dumping. The mold while still hot is placed over a second slush box containing more dry powdered vinyl resin having intimately mixed therewith fine powdered or particulated asbestos fibers. Alternately, the mold may receive a charge of a liquid mixture of a liquid resin and asbestos fines. This vinyl resin containing the asbestos fibers is fused within the mold containing the layer 8 of fused resin to adhere thereto a second layer 7 of fused resin having asbestos dispersed therein to form the skin 6. This skin is then removed from the mold and placed within a rigidizing mold or alternately, it can be left in the skin-casting mold with this mold serving as its own rigidizing means. A suitable foamable reaction mixture of the polyurethane-type is added to the mold within the cavity formed by the skin 6 and allowed to foam to give a foamed article having the desired contour, for instance, that shown in FIGS. 1 and 2. In those instances where it is desired that the seat cushion have a suitable support member 4 such as a wood bottom or burlap insulator, these can be added during the foam operation to spread the foam within the skin in a uniform manner or the reinforcing member 4 may be added after the article is foamed and cured by appropriate cementing or stapling operations.

Representative of the many thermoplastic elastomeric polymers that may be employed in he present invention to cast or form the skin are vinyl polymers preferably in the high viscosity range. Preferred among the latter are the polymers of vinyl chloride, vinyl acetate, vinyl butyral, and copolymers of vinyl chloride and vinyl acetate. A copolymer which has proven satisfactory is one prepared from 93 to 95 percent vinyl chloride and the balance vinyl acetate, with an average molecular weight of approximately 24,000 as determined by the Staudinger method, and having a specific gravity of about 1.34 to 1.37, and softening at approximately 150° F. These above-mentioned polymer materials, when formed for present purposes, require no chemical or other treatment except the addition of a plasticizer.

Plasticizers are employed which are compatible with these polymers, and which contain no constituents that are, as in the case of the polymers, reactive with atmospheric oxygen in the range of atmospheric temperatures. Examples of such plasticizers are tricresyl phosphate, dioctyl phthalate, dicapryl phthalate, dibutyl sebacate, dibutoxy ethyl phthalate, dibutoxyglycol phthalate, polyethyleneglycol di-2-ethyl hexoate, triethylene-glycol-di-2-ethyl hexoate and the like.

A representative example of how this invention can be practiced is shown below with all parts being by weight unless otherwise indicated.

EXAMPLE I

Using apparatus of the type described in patent application, U.S. Ser. No. 618,705 filed Feb. 27, 1967, a box containing a dry commercial powdery plasticized polyvinyl chloride resin was rotated as a unit with a seat cushion skin-forming mold of the contour of FIG. 1 resting thereon. As the mold was at about 500° F. the powdery polyvinyl chloride fused to form a skin of about 5 to 15 mils in thickness depending on duration of the rotation before excess resin was dumped.

Then the mold was moved to a second slush box containing a mixture of 70 parts of powdery plasticized polyvinyl chloride and 30 parts of asbestos fines that passed a 100 mesh U.S. Standard screen. This slush box and mold were rotated to spread the mixture of resin and asbestos fines over the surface of the mold. Since the mold was still above the fusing temperature of the resin it fused to the previous coat to give a skin having an outer surface free of asbestos fines and an inner surface having asbestos fines dispersed therein. After four rotations the excess resin and asbestos fines were dumped and the mold was placed in a water bath to cool.

The skin was removed from the mold and placed in a rigidizing or retaining mold. Then sufficient polyurethane foamable mixture was added to fill the mold when foaming was complete. A wood bottom of the type shown in the drawings was placed in the mold and the foam allowed to rise to fill the skin to give a cushion of the type shown in the drawing.

A polyether urethane foamable reaction mixture used to form the seat cushion in example I was prepared by mixing about 0.94 equivalents of a polypropylene ether triol, 6.85 equivalents of tolylene diisocyanates, then 180 parts of this mixture is mixed with 3.7 parts of N,N,N', N'-tetrakis (2-hydroxy propyl) ethylene diamine, 15.5 parts of glycerol with varying amounts of amine-type catalysts such as triethylene diamine and/or N-ethyl morpholine and from 1 to 2 parts of an auxiliary blowing agent, $CFCl_3$.

A suitable vinyl plastisol for use in rotational casting a skin in accordance with the above example is:

| | Parts |
|---|---|
| Polyvinyl chloride (dispersion grade) | 100 |
| Di-2-ethylhexylphthalate (plasticizer) | 90 |
| Barium and cadmium salt complex (heat and light stabilizer) | 3 |
| Calcium carbonate (filler) | 10 |
| Mineral oil (internal lubricant) | 2 |

The asbestos fibers would be added for formation of the inside layer of the skin.

Other vinyl polymers may be used to form plastisols or powder sols, as for example, polyvinyl acetate, polyvinyl alcohol and chlorosulfonated polyethylene and various vinyl copolymers such as a copolymer of vinyl chloride and vinylidene chloride, as are well known in the art. Various plasticizers such as oxidized soybean oil and diethylene glycol may be used and various other ingredients may be added to form films having desirable characteristics as is well known in the art.

Also, other thermoplastic molding powders such as the terpolymer of acrylonitrile, butadiene and styrene may be used to form the skin.

The polyurethane suitable for use in forming the foam may be the reaction product of an organic polyisocyanate and a polyester, a polyether polyol or a polyhydrocarbon polyol with or without the use of an auxiliary blowing agent such as the low boiling materials, for instance, fluorinated hydrocarbons and/or water.

Thus, by using asbestos fibers in the inner layer of the skin it is possible to obtain a skin having a satisfactory feel or bond and yet has enhanced resistance to cut tear or creep growth. For instance, a piece (1-inch-wide) of skin made according to example I was cut to give the piece a horizontal slit of five eighths inch therein and used to suspend a 3pound weight at 75° F. for 60 days without any creep growth, whereas about 8 to 24 days were the limit where no asbestos fibers were used. The asbestos fibers preferably are present in at least 10 percent by weight per 100 parts of the resin with the upper limit being the amount that makes the resin no longer flowable to coat the mold. This limit varies with fiber size. Where fibers are 1 to 30 mils more can be used than where the fibers are 100, and at around 300 mils the limit is about 10 percent but with 1 mil fibers equal amounts of resin and fiber can be used.

This invention provides a method of obtaining a seat cushion or skin-covered foamed article having an improved adhesive bond between the polyurethane foam and the skin. This improvement in bond is thought to be due to both a mechanical and chemical bond between the foam and the fiber.

While certain representative embodiments and details have been shown for the purpose of illustrating the invention, it will be apparent to those skilled in this art that various changes and modifications may be made therein without departing from the spirit or scope of the invention.

What is claimed is:

1. A foamed article having a skin of at least two layers of vinyl resin and a foamed core, said core being adhered to the vinyl resin layer having intimately dispersed therein particulate asbestos fibers of about 1 to 100 mils in length, said vinyl resin layer containing the asbestos fibers having a vinyl resin covering that contains no asbestos fibers.

* * * * *